Dec. 10, 1940.     J. S. PEAKE ET AL     2,224,160
PRODUCTION OF MAGNESIUM
Filed June 29, 1939
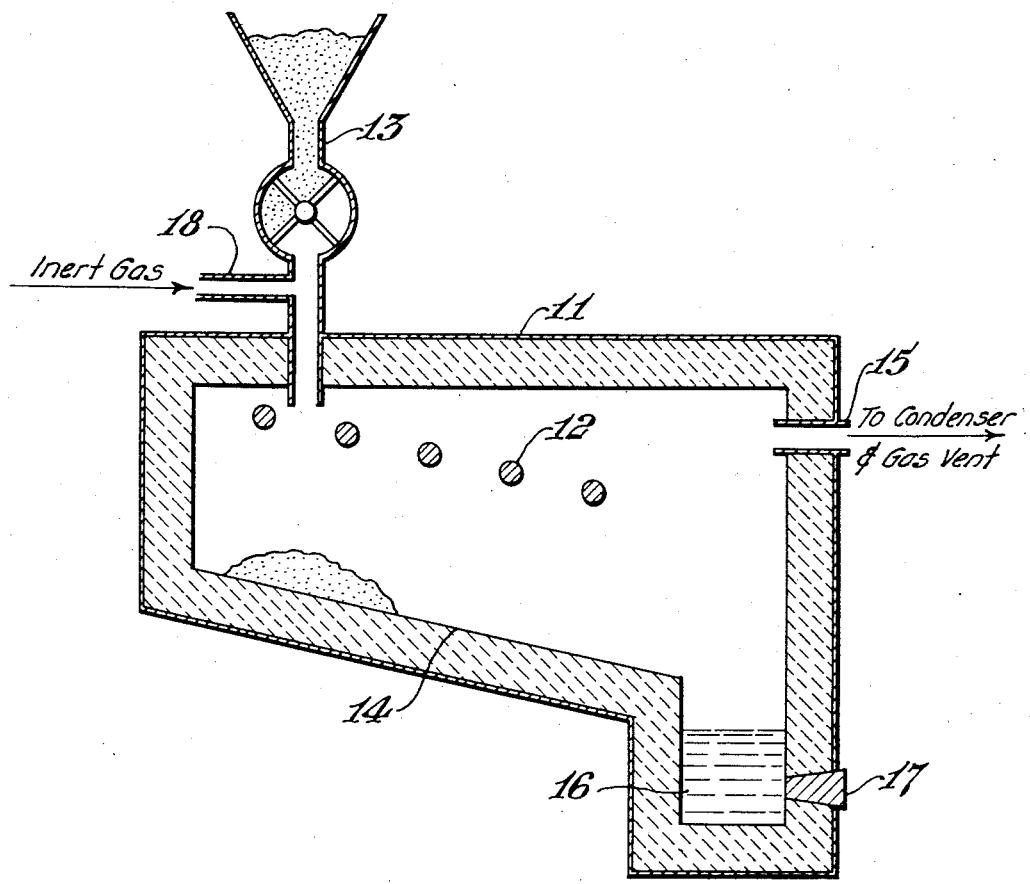
INVENTORS
John S. Peake
Foster C. Bennett
BY Griswold & Burdick
ATTORNEYS.

Patented Dec. 10, 1940

2,224,160

UNITED STATES PATENT OFFICE 2,224,160

PRODUCTION OF MAGNESIUM

John S. Peake and Foster C. Bennett, Midland, Mich., assignors to The Dow Chemical Company, Midland, Mich., a corporation of Michigan Application June 29, 1939, Serial No. 281,890

7 Claims. (Cl. 75—67)

This invention relates to certain improvements in the production of metallic magnesium by the thermal reduction of magnesia, using silicon or aluminum as the reducing agent.

The production of magnesium by the reduction of magnesia and its ores at elevated temperatures by means of silicon or aluminum has frequently been proposed in the prior art. In general, the methods suggested fall into two groups. In one type, a charge comprising magnesia, silicon or aluminum as reducing agent, and a considerable proportion of a flux such as fluorspar is heated at a temperature above its melting point; the magnesia and reducing agent react in the liquid state to form metallic magnesium which vaporizes from the melt and may be withdrawn. In the other type, a charge comprising magnesia and silicon or aluminum is heated at a temperature below its melting point; the magnesia and reducing agent react in the solid state, leaving a solid residue and liberating vaporous metallic magnesium which may then be recovered. Both processes are disadvantageous. The reduction of magnesia in the liquid state is a rather slow reaction and a considerable proportion of the magnesia is never reduced; disengagement of the magnesium vapor from the molten mass is difficult; and there is an appreciable attack on the furnace linings by the molten slag. Reduction exclusively in the solid state, while proceeding at a more rapid rate, gives rise to difficulties in removing the solid residual slag from the zone of reaction, since at the temperatures employed and the conditions existing in the furnace, any metal mechanical moving parts become seriously weakened within a relatively short time.

In the present invention, magnesium is prepared by the thermal reduction of magnesia with silicon or aluminum according to a process in which the mass of reactants charged into the reduction furnace remains essentially in the solid state throughout the major part of the reduction, and then fuses to a molten slag when vaporization of the magnesium is substantially complete, the entire operation being carried out at a temperature between about 1300° C. and about 1500° C. In this way, the advantages of relatively low temperature and solid state reaction conditions are combined with the advantages of a molten slag. The magnesia is completely converted to magnesium, and marked operating efficiency and economy are obtained.

In the process of the invention, the reduction charge consists essentially of magnesia, lime, and as reducing agent at least one of the metals silicon and aluminum, and may also contain at least one of the oxides silica and alumina. These ingredients are employed in proportions such that the reducing agent is present in a quantity chemically equivalent to the magnesia, and such that the molten slag remaining after liberation and vaporization of the magnesium has a composition falling within the range:

(1)

|  | Per cent by weight |
|---|---|
| CaO | 30–53 |
| $SiO_2$ | 36–50 |
| $Al_2O_3$ | 2–25 |
| Other substances | 0–7 | these constituents being present chiefly in combination with one another as complex silicates. Optimum efficiency of the process is obtained when the ingredients of the initial charge are mixed in such proportions that the composition of the slag remaining after reduction is within the narrower range:

(2)

|  | Per cent by weight |
|---|---|
| CaO | 45–53 |
| $SiO_2$ | 36–45 |
| $Al_2O_3$ | 2–18 |
| Other substances | 0–7 |

Such slags are molten at temperatures below 1450° C.

As will be appreciated, it is possible to compound the ingredients mentioned into reduction charges having a variety of initial compositions, all of which will, nevertheless, after liberation of the magnesium, form slags having compositions within the range (1) and preferably within the range (2). All such charges will remain essentially in the solid state throughout liberation of the magnesium, and then fuse to a molten slag, and all permit operation at temperatures in the range 1300°–1500° C.

As stated, in the process of the invention, the reducing agent is employed in a proportion such that the active agents thereof (silicon, aluminum, or both) are present in a quantity chemically equivalent to the magnesia in the charge. In this way, at the reaction temperature the magnesia is substantially all converted to magnesium, which vaporizes, and little if any unreacted magnesia remains in the residue after reduction. All the silicon or aluminum in the reducing agent, in reacting with the magnesia, is converted to silica or alumina, both of which oxides are essential in the slag. For this reason it is desirable but not essential to use a reducing agent containing both silicon and aluminum. If the reducing agent employed is silicon or ferro-silicon alone, no alumina is formed in the thermal reduction, and it is then necessary to add alumina to the charge in order to bring the residual slag within the composition range (1) specified. Similarly, if aluminum is the sole reducing agent, it is necessary to add silica. In the reduction, it is also desirable to maintain as high a concentration of lime in the charge as is consistent with the formation of slags falling within the proportions set forth, since high concentrations of lime appear to increase markedly the ease with which the magnesium is liberated.

As noted above, in preparing a reduction charge the ingredients are mixed in proportions such that the reducing agent is equivalent to the magnesia and such that on reduction the mixture forms slags falling within the range of composition (1) mentioned above. The exact proportions of each constituent to be used in any given charge may be determined by a simple stoichiometric computation. Care must be taken that the ingredients are measured accurately, since the lower limit on the content of $Al_2O_3$ (2 per cent) and of $SiO_2$ (36 per cent) in the slag, and the upper limit on the CaO content (53 per cent) are critical. If any of these limits is exceeded by even a small degree, the resulting slags are so high melting as to be wholly inoperable for the present purpose.

In the reduction charges, the magnesia may be added as such, e. g., in the form of calcined magnesite, calcined brucite, or chemically precipitated magnesium oxide. Similarly, the lime may be added per se. Alternatively, the magnesia and lime may be added together in combined form, as in calcined dolomite, or as mixtures of calcined dolomite with magnesia or lime. The reducing agent may be silicon, aluminum, mixtures thereof, or alloys in which these metals predominate, such as ferro-silicon, ferro-aluminum, alumino-silicon, etc. Alumina, if required, is added preferably in the form of calcined bauxite, and silica as sand or a suitable silicate. If desired, a fluoride flux, such as fluorspar, may also be added to the charge to thin the molten slag formed after reduction. However, the proportion of such flux must not exceed about five per cent, since by the use of a higher proportion the reduction charge will become molten before liberation of the magnesium is complete.

In practice, the magnesia and lime (preferably together as calcined dolomite), reducing agent, and alumina or silica if necessary, are mixed in the desired proportions and are ground to a powder. This mixture is placed into a suitable vessel and heated to a temperature between about 1300° C. and about 1500° C., usually 1350°–1450° C., and preferably at reduced pressure, e. g., an absolute pressure 2 inches of mercury or less, or in the presence of an inert gas, such as hydrogen or helium. At this temperature the magnesium is rapidly liberated as a vapor, which may be withdrawn and condensed to form highly pure magnesium. The reaction mixture remains solid during most of the reduction, but when liberation of magnesium is substantially complete, fuses to a molten slag which may readily be removed from the vessel.

One form of apparatus adapted to carrying out the process of the invention is illustrated in diagrammatic section in the accompanying drawing. The apparatus shown consists of a furnace 11 lined with graphite blocks and heated internally to a temperature of 1350°–1450° C. by electrical resistor elements 12. The ground reduction mixture is charged into the furnace through an inlet 13 and drops onto the sloping hearth 14. At the temperature of the furnace, magnesium vapors are evolved rapidly and escape through an outlet 15 to a suitable condenser. When liberation of the magnesium is substantially complete, the residue fuses to a molten slag which runs down the hearth 14 to a pit 16 from which it may be withdrawn from time to time through a tap 17. Air is excluded from the furnace by maintaining an inert atmosphere by introducing inert gas through an inlet 18, preferably at reduced pressure. The reduction process may be made continuous merely by adding fresh charge through the inlet 13 at a steady rate. Those portions of the charge which have liberated their magnesium and then fused flow down the hearth to the pit without interfering with the portions which have not yet liquefied. At the temperatures employed the slag does not appreciably attack the graphite lining of the furnace. It will also be noted that in the apparatus described no moving parts are exposed to the furnace heat.

The following examples will illustrate the process of the invention, but are not to be construed as in any way limiting its scope.

*Example 1*

A reduction mixture was prepared by grinding together 40.5 parts by weight of magnesia, 37.3 parts of lime, 18.7 parts of ferro-silicon (75 per cent Si) and 3.56 parts of alumina. This mixture was placed in a graphite crucible and heated at a temperature of 1350°–1450° C. in an evacuated muffle furnace equipped with a magnesium condenser and a sight glass. When the charge reached the reaction temperature, evolution of magnesium vapor began and was substantially complete within about 60 minutes. The charge remained substantially solid throughout the volatilization of the magnesium and then fused to a molten mass. Of the total magnesium content of the charge, 90 per cent was recovered from the condenser. The molten slag was found to have a melting point of 1355° C. and to correspond to the composition

| | Per cent by weight |
|---|---|
| CaO | 49.9 |
| $SiO_2$ | 40.4 |
| $Al_2O_3$ | 4.5 |
| Other constituents (chiefly Fe) | 5.2 |

This residue was practically free of MgO.

*Example 2*

The run of Example 1 was repeated except that 2 per cent of fluorspar was added to the initial charge. In this case 93.5 per cent of the magnesium content of the charge was recovered. The slag formed at the end of the reaction had essentially the same composition and melting point as that in Example 1, but was much more fluid at temperatures of 1350°–1450° C.

*Example 3*

A mixture containing 38.7 parts of magnesia, 36.0 parts of lime, 18.1 parts of ferro-silicon (75 per cent), and 7.24 parts of $Al_2O_3$ was heated as in Example 1. Reaction was complete in 16 minutes, 91.2 per cent of the magnesium in the charge being recovered from the condenser. The slag had a melting point of 1273° C. and corresponded to the composition

| | Per cent by weight |
|---|---|
| CaO | 47.5 |
| SiO₂ | 38.0 |
| Al₂O₃ | 9.5 |
| Other constituents (mostly Fe) | 5.0 |

*Example 4*

A mixture consisting of 60.7 parts of calcined dolomite, 12.5 parts of magnesia, 17.7 parts of ferro-silicon (75 per cent), 7.1 parts of calcined bauxite, and 2.0 parts of fluorspar was charged continuously into an inclined hearth furnace such as illustrated in the accompanying drawing. The furnace was maintained at a temperature of 1410° C.; the inert gas used was helium. As portions of the charge liberated their magnesium, they fused to a slag which drained into the pit. This slag was substantially free of magnesia. The recovery of magnesium was 80 per cent.

The process of the present invention, in which the reduction charge remains solid until nearly reacted, and then fuses, possesses numerous advantages. Inasmuch as the charge is solid during reaction, the magnesium vapor can escape easily nad uniformly at all times. However, the reacted slag is molten and flows away from the unreacted portions of the charge and does not form a hard casing on the surface thereof. No moving parts are required for conveying the residue from the furnace. There is little if any attack on furnace linings. Excessive temperatures are avoided. In addition, substantially complete liberation of magnesium from its ores is attained rapidly and with maximum simplicity and economy.

The term "inert atmosphere" as employed in the claims is intended to refer to operation both in vacuo and in the presence of an inert gas, as hereinbefore disclosed.

Other modes of applying the principle of the invention may be employed instead of those explained, change being made as regards the details disclosed, provided the step or steps stated in any of the following claims or the equivalent of such stated step or steps be employed.

We therefor particularly point out and distinctly claim as our invention:

1. In a process for producing magnesium by the thermal reduction of magnesia and volatilization of magnesium, the step which comprises heating in an inert atmosphere and at a temperature between about 1300° C. and about 1500° C. a charge essentially comprising magnesia, lime, and as a reducing agent at least one of the metals silicon and aluminum, the ingredients of the charge being employed in such proportion that the reducing agent is present in a quantity substantially chemically equivalent to the magnesia and that the slag formed on reduction has a melting point below 1450° C. and a composition falling within the range

| | Per cent by weight |
|---|---|
| CaO | 30–53 |
| SiO₂ | 36–50 |
| Al₂O₃ | 2–25 |
| Other substances | 0– 7 |

2. In a process for producing magnesium by the thermal reduction of magnesia and volatilization of magnesium, the step which comprises heating at reduced pressure and at a temperature between about 1300° C. and about 1500° C. a charge essentially comprising magnesia, lime, and as a reducing agent at least one of the metals silicon and aluminum, the ingredients of the charge being employed in such proportion that the reducing agent is present in a quantity substantially chemically equivalent to the magnesia and that the slag formed on reduction has a melting point below 1450° C. and a composition falling within the range

| | Per cent by weight |
|---|---|
| CaO | 30–53 |
| SiO₂ | 36–50 |
| Al₂O₃ | 2–25 |
| Other substances | 0– 7 |

3. In a process for producing magnesium by the thermal reduction of magnesia and volatilization of magnesium, the step which comprises heating in an inert atmosphere and at a temperature between about 1300° C. and about 1500° C. a charge consisting essentially of magnesia, lime, as a reducing agent at least one of the metals silicon and aluminum, and at least one of the oxides silica and alumnia, the ingredients of the charge being employed in such proportion that the reducing agent is present in a quantity substantially chemically equivalent to the magnesia and that the slag formed on reduction has a melting point below 1450° C. and a composition falling within the range

| | Per cent by weight |
|---|---|
| CaO | 30–53 |
| SiO₂ | 36–50 |
| Al₂O₃ | 2–25 |
| Other substances | 0– 7 |

4. In a process for producing magnesium by the thermal reduction of magnesia and volatilization of magnesium, the step which comprises heating in an inert atmosphere and at a temperature between about 1300° C. and about 1500° C. a charge consisting essentially of magnesia, lime, as a reducing agent at least one of the metals silicon and aluminum, and at least one of the oxides silica and alumina, the ingredients of the charge being employed in such proportion that the reducing agent is present in a quantity chemically equivalent to the magnesia, and the slag formed on reduction has a melting point below 1450° C. and a composition falling within the range

| | Per cent by weight |
|---|---|
| CaO | 45–53 |
| SiO₂ | 36–45 |
| Al₂O₃ | 2–18 |
| Other substances | 0– 7 |

5. In a process for producing magnesium by the thermal reduction of magnesia and volatilization of magnesium, the step which comprises heating in an inert atmosphere and at a temperature between about 1300° C. and about 1500° C. a charge comprising magnesia, lime, ferro-silicon, and alumina, the ingredients of the charge being employed in such proportions that the silicon in the ferro-silicon is present in a quantity chemically equivalent to the magnesia, and that the slag formed on reduction has a melting point below 1450° C. and a composition falling within the range

|  | Per cent by weight |
|---|---|
| CaO | 45–53 |
| $SiO_2$ | 36–45 |
| $Al_2O_3$ | 2–18 |
| Other substances | 0–7 |

6. In a process for producing magnesium by the thermal reduction of magnesia and volatilization of magnesium, the step which comprises heating in an inert atmosphere and at a temperature between about 1300° C. and about 1500° C. a charge consisting essentially of magnesia, lime, ferro-silicon, and alumina, and containing fluorspar in a quantity less than 5 per cent by weight, the ingredients of said charge being mixed in such proportion that the silicon in the ferro-silicon is chemically equivalent to the magnesia and that the slag formed on reduction has a melting point below 1450° C. and a composition falling within the range

|  | Per cent by weight |
|---|---|
| CaO | 45–53 |
| $SiO_2$ | 36–45 |
| $Al_2O_3$ | 2–18 |
| Other substances | 0–7 |

7. In a process for producing magnesium by heating in an inert atmosphere a reduction charge essentially comprising magnesia, lime, and as a reducing agent at least one of the metals silicon and aluminum, the ingredients of the charge being mixed in proportions such that the reducing agent is present in a quantity substantially chemically equivalent to the magnesia, and such that the charge remains essentially in the solid state until liberation of the magnesium is substantially complete and then fuses to a molten slag, the step which comprises heating said charge in a sloping hearth furnace maintained at a temperature between about 1300° C. and about 1500° C., whereby the charge reacts essentially in the solid state to form magnesium which volatilizes from the reaction mixture leaving a slag which becomes molten when liberation of the magnesium is substantially complete and flows from the reaction zone.

JOHN S. PEAKE.
FOSTER C. BENNETT.